United States Patent
Wang

(10) Patent No.: US 9,559,796 B1
(45) Date of Patent: Jan. 31, 2017

(54) LOCATION SENSITIVE, PUBLIC SECURITY ADVISORY SYSTEM AND METHOD

(71) Applicant: Calvin Jiawei Wang, Morganville, NJ (US)

(72) Inventor: Calvin Jiawei Wang, Morganville, NJ (US)

(*) Notice: Subject to any disclaimer, the term of this patent is extended or adjusted under 35 U.S.C. 154(b) by 0 days.

(21) Appl. No.: 15/200,162

(22) Filed: Jul. 1, 2016

Related U.S. Application Data

(60) Provisional application No. 62/256,717, filed on Nov. 18, 2015.

(51) Int. Cl.
| | |
|---|---|
| H04M 11/04 | (2006.01) |
| H04H 20/59 | (2008.01) |
| H04W 4/02 | (2009.01) |
| H04H 20/71 | (2008.01) |
| H04W 60/04 | (2009.01) |
| H04W 64/00 | (2009.01) |
| H04W 4/22 | (2009.01) |
| H04W 4/12 | (2009.01) |
| H04L 29/08 | (2006.01) |

(52) U.S. Cl.
CPC ............ *H04H 20/59* (2013.01); *H04H 20/71* (2013.01); *H04L 67/18* (2013.01); *H04W 4/02* (2013.01); *H04W 4/12* (2013.01); *H04W 4/22* (2013.01); *H04W 60/04* (2013.01); *H04W 64/00* (2013.01); *H04W 64/003* (2013.01)

(58) Field of Classification Search
CPC ...... H04W 60/04; H04W 4/22; H04W 64/003; H04W 64/00; H04W 4/02; H04W 4/12; H04L 67/18; H04H 20/59; H04H 20/71
USPC .... 455/421, 422.1, 433, 435.1, 435.2, 404.1
See application file for complete search history.

(56) References Cited

U.S. PATENT DOCUMENTS

| | | | |
|---|---|---|---|
| 5,898,622 A * | 4/1999 | Ferrant | G11C 7/062 365/189.15 |
| 9,099,014 B2 * | 8/2015 | Dayan | G06Q 10/101 |
| 2003/0190023 A1 * | 10/2003 | Farkas | A61B 5/02055 379/106.02 |
| 2006/0003775 A1 * | 1/2006 | Bull | G01S 5/0205 455/456.1 |
| 2007/0165641 A1 * | 7/2007 | Fitchett | H04L 29/06027 370/392 |
| 2008/0048021 A1 * | 2/2008 | Shieh | G06Q 10/02 235/380 |
| 2008/0255754 A1 * | 10/2008 | Pinto | G01C 21/3691 701/119 |
| 2009/0201190 A1 * | 8/2009 | Huthoefer | G01S 7/003 342/27 |
| 2011/0019587 A1 * | 1/2011 | Wang | H04L 63/08 370/254 |

(Continued)

*Primary Examiner* — Dominic Rego
(74) *Attorney, Agent, or Firm* — Dale J. Ream

(57) ABSTRACT

A location sensitive, public security advisory system and method that communicates with the service subscriber app running on mobile devices, and utilizes the real-time location information to present comprehensive subscriber status information in a given area of interest to security agents. This system can also identify zones at different security status and direct the apps on the mobile devices to display textual alerts and visual geographical zone alerts on the map and blueprint of the area of interest. The system can also provide escape route advice to the subscribers textually or visually on the app's map.

20 Claims, 4 Drawing Sheets

(56) References Cited

U.S. PATENT DOCUMENTS

| | | | |
|---|---|---|---|
| 2011/0047246 A1* | 2/2011 | Frissora | G06F 9/543 709/219 |
| 2011/0105084 A1* | 5/2011 | Chandrasekaran | H04L 63/107 455/411 |
| 2011/0267221 A1* | 11/2011 | Brundick | G01S 13/878 342/180 |
| 2012/0064891 A1* | 3/2012 | Wijayanathan | H04W 4/021 455/435.1 |
| 2013/0094538 A1* | 4/2013 | Wang | H04B 1/707 375/141 |
| 2013/0143519 A1* | 6/2013 | Doezema | G08B 21/0446 455/404.2 |
| 2015/0230072 A1* | 8/2015 | Saigh | H04W 4/22 455/404.1 |
| 2015/0373554 A1* | 12/2015 | Freda | H04W 16/14 455/450 |
| 2016/0033295 A1* | 2/2016 | Li | G01C 21/367 345/660 |

* cited by examiner

LOCATION SENSITIVE, PUBLIC SECURITY ADVISORY SYSTEM AND METHOD

REFERENCE TO RELATED APPLICATION

This non-provisional patent application claims the benefit of provisional application Ser. No. 62/256,717 filed on Nov. 18, 2015, titled Location Sensitive, Public Security Advisory System and Method.

BACKGROUND

The Second Amendment is a frequent subject of debate in today's world. Although firearms are essential for self-protection, others have abused this right by using firearms to hurt others. Because of this, security and safety have been enormous problems in public gatherings, where armed assaulters like to carry out their crimes. The list of school shootings goes on, with well-known occurrences such as the Columbine shooting which killed 15, the Virginia Tech attack which claimed the lives of 33, and the Sandy Hook massacre where 28 elementary school students and teachers were expunged.

Firearm assaults do not occur only at schools, as they are also prevalent in other areas of mass congregation. Who would forget the killings at The Dark Knight Rises premiere or, more recently, the mass murders in Parisian concert halls which killed over 120 people and injured more than 300? Even with all the implementations of safety such as lockdown drills in schools and exit routes in public buildings, firearm assaults are occurring at a faster rate than ever, with multiple sources such as the Washington Post saying that there is approximately one school shooting a week. Clearly, modern security is not yet elite and must be improved.

Therefore, it would be desirable to improve public security by having an advisory system that is location sensitive to the position of system subscribers while in pre-defined geographic areas and configured to offer advisory messages to the subscribers located in an emergency situation. Further, it would be desirable to have a public security advisory system that registers a position of individuals via the person's mobile software application (referred to as "the app") as soon as they enter a pre-defined geographic area and which deregisters them upon exit from the predefined area.

BRIEF SUMMARY OF THE INVENTION

In order to improve public security, this invention will use location-based services to determine people's positions in a state of emergency and provide advisory communications to them. Initially, a geographical boundary is created for the area of interest, usually a place of mass aggregation, like school buildings, theaters, and stadiums. Once individuals enter the vicinity of an area defined by the geographical boundary, the mobile app of this invented system will register itself to the relevant security advisory system by sending out a registration request with the correspondent user information. In return, the mobile app is instructed to download the blueprints of the area for later use, if needed. After registering, the mobile app user's identity, location information, and user profile will be included into the security advisory system's list for later use under an emergency situation. As long as the mobile device remains within the geographical boundary of the interested area under security surveillance, the mobile app will update the security advisory system of its location information. Once they move out of the boundary of interest, the mobile device app will deregister from the security advisory server.

In a state of emergency (referred to as an "emergent state" or "emergency state mode") the police and agents of security will have access to the location of everyone that has registered to the system. The security advisory apps will be actuated to switch into an emergency state mode. With the help of earth map and the blueprints of the area, the security agencies are able to clearly determine the location of those people visually on displayed maps. As a result, they have the ability to instruct people on how to behave in a state of emergency. In dire circumstances, the police can analyze the situation and give people advice based on their location during the emergency by sending text messages through the app, instruct the app to display the blueprints of the area and identify zones to avoid, and even to suggest escape routes. This improved communication between trained security and potential victims will provide for more cohesion and guidance in a state of chaos, and this guidance could definitely improve safety and lessen casualties.

DETAILED DESCRIPTION OF THE INVENTION

Figure 1:
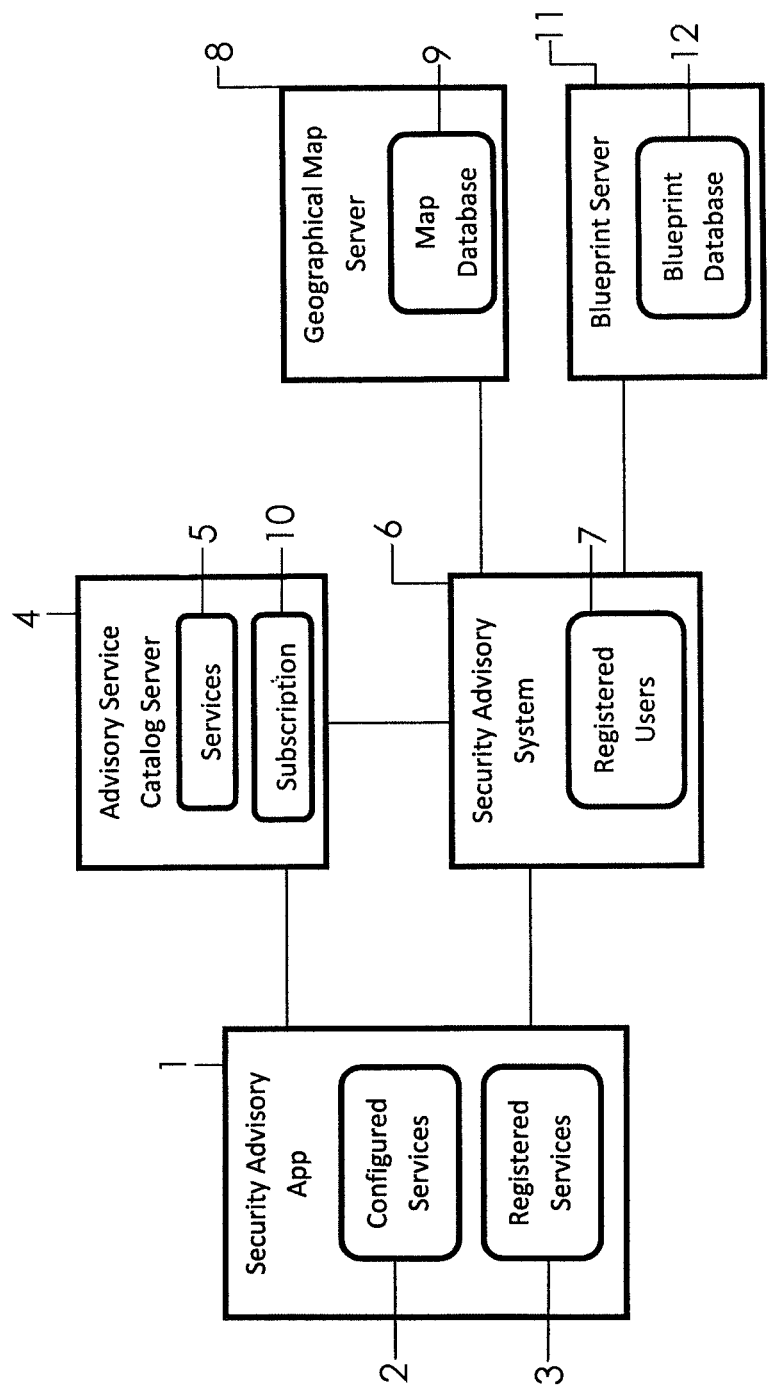
FIG. 1 is a block diagram illustrating the location sensitive, security advisory system in accordance with a preferred embodiment of the present invention.

A system and method for location sensitive public security according to a preferred embodiment of the present invention will now be described in detail with reference to FIGS. 1 to 5 of the accompanying drawings. The security system includes a security advisory software application 1 running on a mobile computing device, a security advisory catalog server 4, a geographical map server 8, a blueprint server 11, and a security advisory system 6.

The security system includes a security advisory software application 1 (referred to simply as a "security advisory app" or just an "app") running on the user's mobile device (not shown), the mobile device including a cell phone, electronic tablet, or the like. It is understood that the present invention may include a plurality of security advisory apps 1 running on a plurality of separate and independent mobile devices. A user uses the security advisory app 1 to subscribe to or otherwise communicate with the available security advisory services stored and managed on the advisory service catalog server 4. The catalog server 4 assigns each subscriber a pre-allocated passcode or similar means of authentication. The security advisory app 1 includes a memory having a "Configured Services" database 2 configured to store data relating to security services subscribed to as described above. The security advisory app 1 may also include a registered services database 3 configured to store data regarding registration with a security advisory system 6 as will be described later in more detail.

The security advisory app 1 may communicate with the advisory service catalog server 4 wirelessly or via a modem or router that connects via the internet. It is understood that the advisory service catalog server 4 is in data communication with every security advisory system 6 and includes boundary and other data specific to each one. For this reason, when a particular security advisory application 1 is communicating with a respective security advisory system 6, the security advisory application 1 is also in communication with the catalog server 4. In an embodiment, the advisory system 6 and catalog server 4 may be running on the same server.

The advisory service catalog server 4 includes a Services database 5 that identifies a range of security services that a user may select from via a respective security advisory app 1. Similarly, the advisory service catalog server 4 may include a user subscription database 10 that records what services a respective security advisory app 1 has signed up to receive.

Once the subscription request is authenticated and authorized, the catalog server 4 assigns a unique subscriber ID corresponding to the advisory service subscribed to, downloads the geographical boundaries corresponding to the advisory service to a respective security advisory app 1, and assigns the unique service ID of that particular service. The catalog server 4 also stores the subscriber and subscription information into its local database. The catalog server 4 is configured to notify the relevant subscribers to make corresponding changes whenever the geographical boundary of a particular security advisory system/service changes. Alternatively, updated boundaries of an advisory system are automatically delivered to subscribing security advisory apps.

These preconfigured security advisory services and their geographical boundaries are stored by a respective security advisory application on a respective mobile device for later use. This method is more suitable for sensitive, private areas, such as high schools and hospitals. Subscribers by this method have a higher-level of trust and can be treated differently during a emergency situation.

Alternatively, the security advisory app 1 is enabled by its configuration setting to dynamically "discover" available security advisory services (also referred to individually as a security advisory system 6) by interacting with the catalog server 4. The security advisory app 1 dynamically updates its current geographic location to the catalog server 4. It is understood that the security advisory app 1 may be in electronic communication with an online real geo-position application or service configured to provide real time geographic position data. The catalog server 4, based on the location, notifies the security advisory app 1 of advisory services available to public access. The security advisory app 1 then prompts the user whether to subscribe to the available services. If the end user decides to subscribe to a certain service, a registration request is sent to the catalog server 4 and, when accepted, the relevant geographical boundaries of that service and the relevant service identification will be sent to the security advisory app 1. This method is more suitable for public areas, such as football stadium, theaters, etc. The security advisory system 6 may include a Registered User database 7 that is configured to store identifying information about all security advisory apps 1 that have registered with the advisory system 6.

Whenever a user enters the geographical boundary of a particular security advisory system 6 that is statically configured, the security advisory app 1 sends an inquiry to the advisory service catalog server 4 and obtains the network address of different forms (hostname or IP address) that provides the corresponding service. If the security advisory system 6 is dynamically discovered, this address is returned to the advisory app 1 as the result of the discovery process. Then, the mobile advisory app 1 is configured to send a service registration request directly to the interested security advisory system 6 with its subscription id, mobile number, user profile information.

By contrast, once the security advisory app 1 detects itself leaving the geographical boundary of a registered advisory system, it deregisters itself from the advisory server 6 or catalog server 4.

The advisory service catalog server 4 maintains all the up-to-date information for various security advisory services in the Services database 5, including their corresponding geographical boundaries, service types, server addressees, etc. It also keeps a subscription database 10 that lists all the security mobile app subscription ID's and their subscribed security advisory services. It is able to handle both static, preconfigured service subscriptions as well as dynamic, real-time service subscriptions.

The security advisory system 6 keeps a list of all the subscribers that have entered into the geographical boundaries of interest for security advisory services, and successfully registered themselves to the relevant advisory system. Upon receiving the registration request from the security advisory app 1, the advisory system 6 can, depending on the nature and type of its services, optionally authenticate the subscription with the catalog server 4. Then the security advisory system 6 is configured to store the subscriber information into its local registered users' database 7 that keeps track of all the registered users.

Upon registration of a security advisory app 1 (having entered the associated boundaries), the security advisory system 6 retrieves relevant geographical maps from the map database 9 of the geographical map server 8 and the blueprints of the area from the blueprint database 12 of the blueprint server 11 then send the both sets of data to the security advisory app 1 for later use at a potential future emergency situation. Alternatively, the advisory system 6 may only send back the blueprints to the security advisory app 1. The advisory app 1 is configured (i.e. programmed) to retrieve geographical maps from a third-party online map provider such as Google or Aloha. Alternatively, the maps can also be proactively sent to all the registered users when an emergency situation occurs. Though this alternative approach may save some initial resources, it causes massive burst traffic at emergency situation and could lead to the defeat of the very purpose of the present invention.

The advisory service catalog server 4, the security advisory system 6, the geographical map server 8, and the blueprint server 11 are functional components of the overall invention. They can reside on one physical computer or on different computers. For instance one or more advisory system 6 may include or be in electronic communication with geographical map server 8 and blueprint server 11. Alternatively, the geographical map server and blueprint server may be commercial, third party resources in electronic communication with the advisory system 6. The core functionalities and capabilities are delivered by the advisory service catalog server 4 and the security advisory system 6.

Once an emergency situation occurs within or close to the area of interest, respective security agents initiate the security emergency state on the respective security advisory system 6. The security advisory system 6 then broadcasts a message to all the registered advisory apps to switch it into emergency state. Under the emergency state, the advisory system 6 is authorized to display all the registered users' locations on geographical maps and the area blueprints in real-time. In other words, the location of each security advisory app 1 (running on its associated mobile device) is rendered in real time on the respective geographic map or blueprint. Each map may be sent to each user and may be sent to security authorities simultaneously.

Further, the security agents can also pinpoint different types of zones, for example, dangerous zones, suspicious zones, safe zones, etc., on the map in real-time. Based on the subscribers' location, for example, the distance to the dangerous zones or safe zones, or their personal profile information may be displayed, such as age group, type of subscription, or the like. In addition, the security agents can direct the security advisory system 6 push security advice to the security advisory app 1. The security advice may include, but is not limited to, text advisory messages and visual map directives. The visual map directives may instruct the security advisory app 1 display different zones on the geographical maps and blueprints. The directives may provide visual safe escape route advice to the mobile users.

Now, more specific description is given of the patent illustrations.

The connections between different boxes (1, 4, 6, 8, and 11) represent communication channels between components; communications may be achieved by software on a local computer, mobile device, wirelessly, or through data networks such as the internet.

Figure 2:
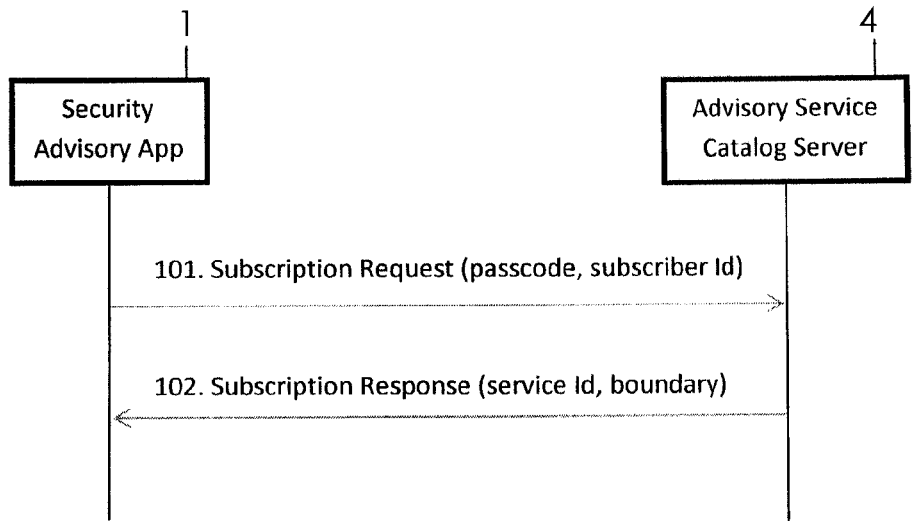
FIG. 2 is an exemplary message flow diagram illustrating the static service subscription message exchanges in accordance with the present invention.

FIG. 2 is a representation of one exemplary message flow diagram illustrating the static service subscription message exchanges as described above in more detail. More particularly, the security advisory app 1 sends message 101 to the advisory service catalog server 4 to request subscribing to a particular service associated with a pre-authorized passcode. The catalog server 4, after authentication and authorization, sends back message 102 with the service ID and geographical boundary data and include the subscription information into a catalog server database.

Figure 3:
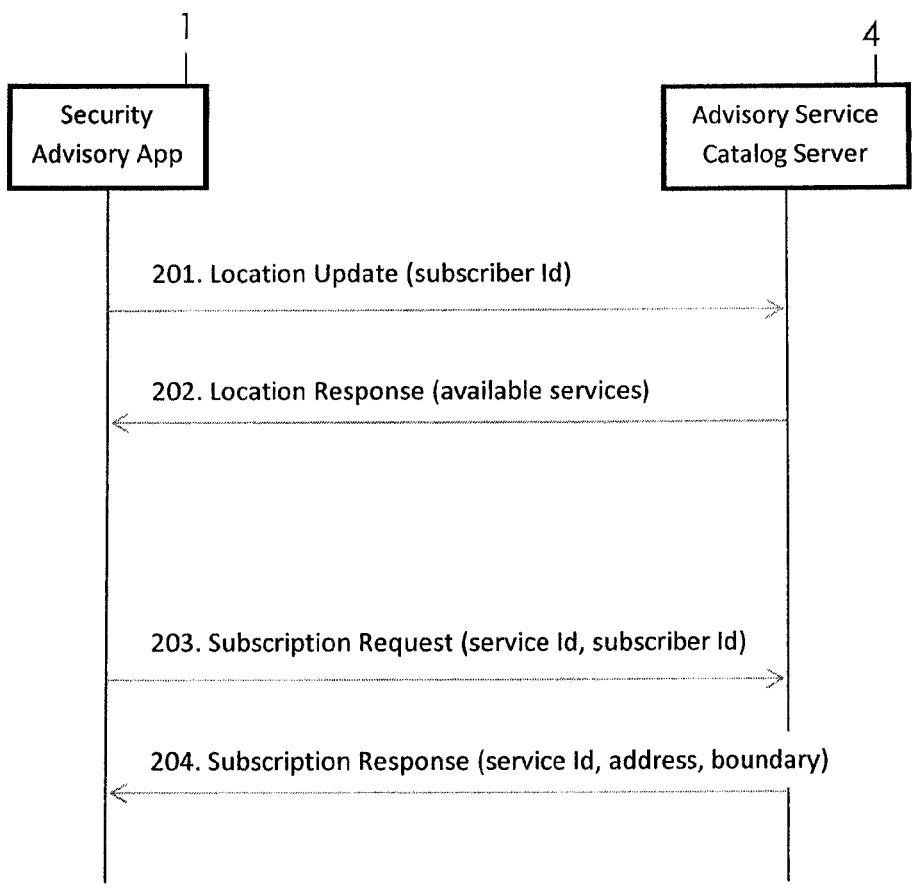
FIG. 3 is an exemplary message flow diagram illustrating the dynamic service discovery message exchanges in accordance with the present invention.

FIG. 3 is a representation of one exemplary message flow diagram illustrating the dynamic service discovery message exchanges in accordance with the present invention. The security advisory app 1 may send message 201 to the advisory service catalog server 4 to discover available security advisory services relevant to its current location. The catalog server 4 sends back message 202 with a list of available service candidates (possible advisory systems 6) to choose, if there are any. The security advisory app1 sends message 203 to the advisory service catalog server 4 to request subscribing to a particular service of interest. The catalog server 4 sends back message 204 with the geographical boundary of the service and the address of the security advisory system 6.

Figure 4:
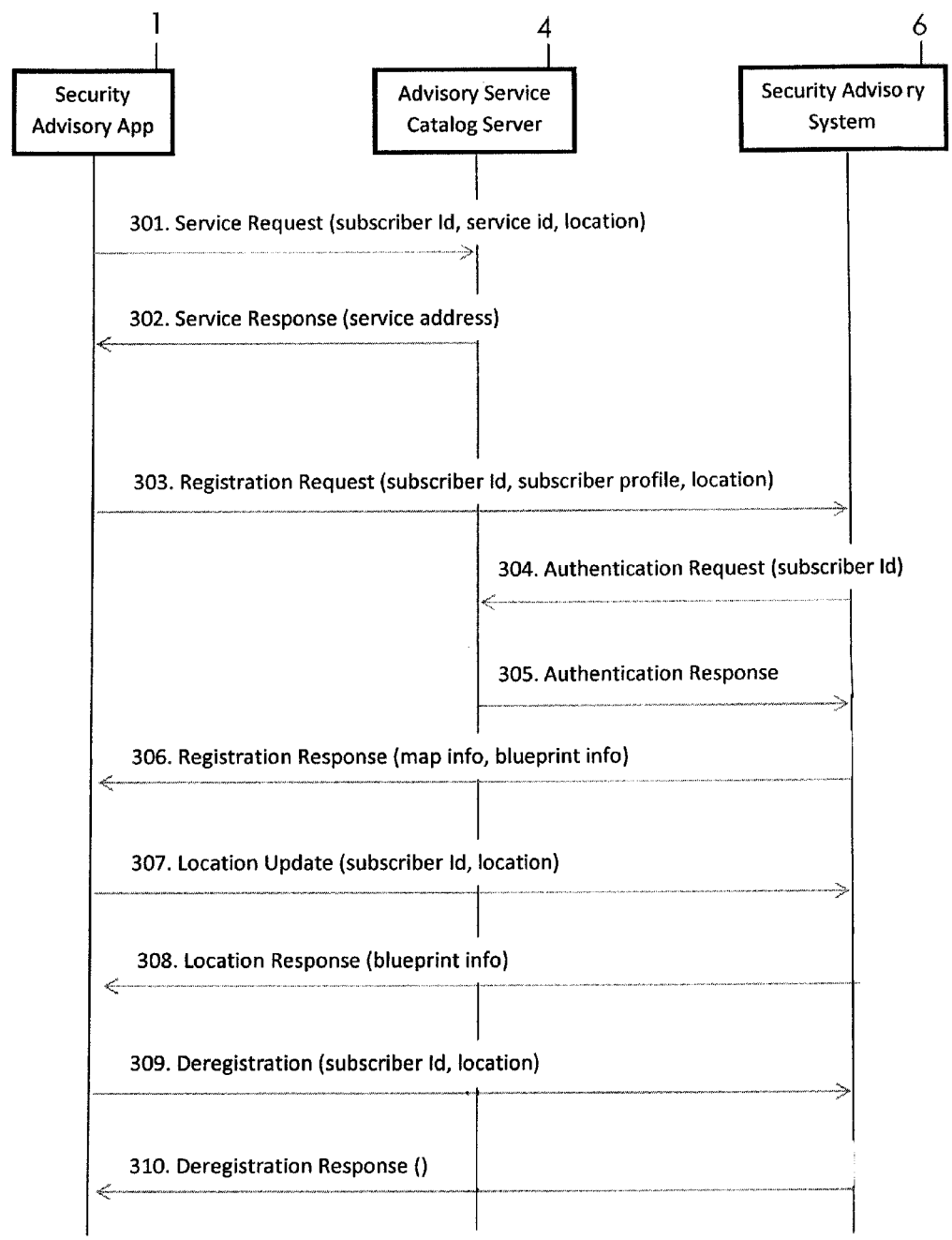
FIG. 4 is an exemplary message flow diagram illustrating the service registration message exchanges in accordance with the present invention.

FIG. 4 is a representation of one exemplary message flow diagram illustrating the service registration message exchanges in accordance with the present invention. For statically subscribed services, the security advisory app 1 detects itself entering into the geographical boundary of a subscribed service and, upon entry, sends message 301 to the Advisor Service catalog server 4 to acquire the network address of the particular security advisory system 6. The catalog server sends back the up-to-date network address of the corresponding security advisory system 6 in message 302.

For both statically subscribed and dynamically discovered services, the security advisory app 1 sends a registration request message 303 with its location and subscriber profile information to the corresponding security advisory system 6 for the particular service. The security advisory system 6 optionally, if configured appropriately, authenticates the registration request with the catalog server 4 by messages 304 and 305.

Upon successful authentication, the security advisory system 6 includes the subscription profile and location information into its local Registered Users database 7, and sends message 306 back with relevant geographical map information and blueprints information for the advisory app 1 to use. Optionally, the geographical map information can be determined by the advisory app 1 and the maps can be retrieved from third-party map solutions as described above. The advisory app 1 updates its location to advisory system 6 in message 307. The advisory system 6 responds to the advisory app 1 and includes updated blueprint map information in message 308, if needed.

Once the advisory app 1 detects that the end user moves out of the geographical boundary of the registered service, the security advisory app 1 deregisters itself from the advisory system 6 with message 309. The advisory system 6 removes the subscriber from its User database 7, and responds to the app by message 310.

Figure 5:
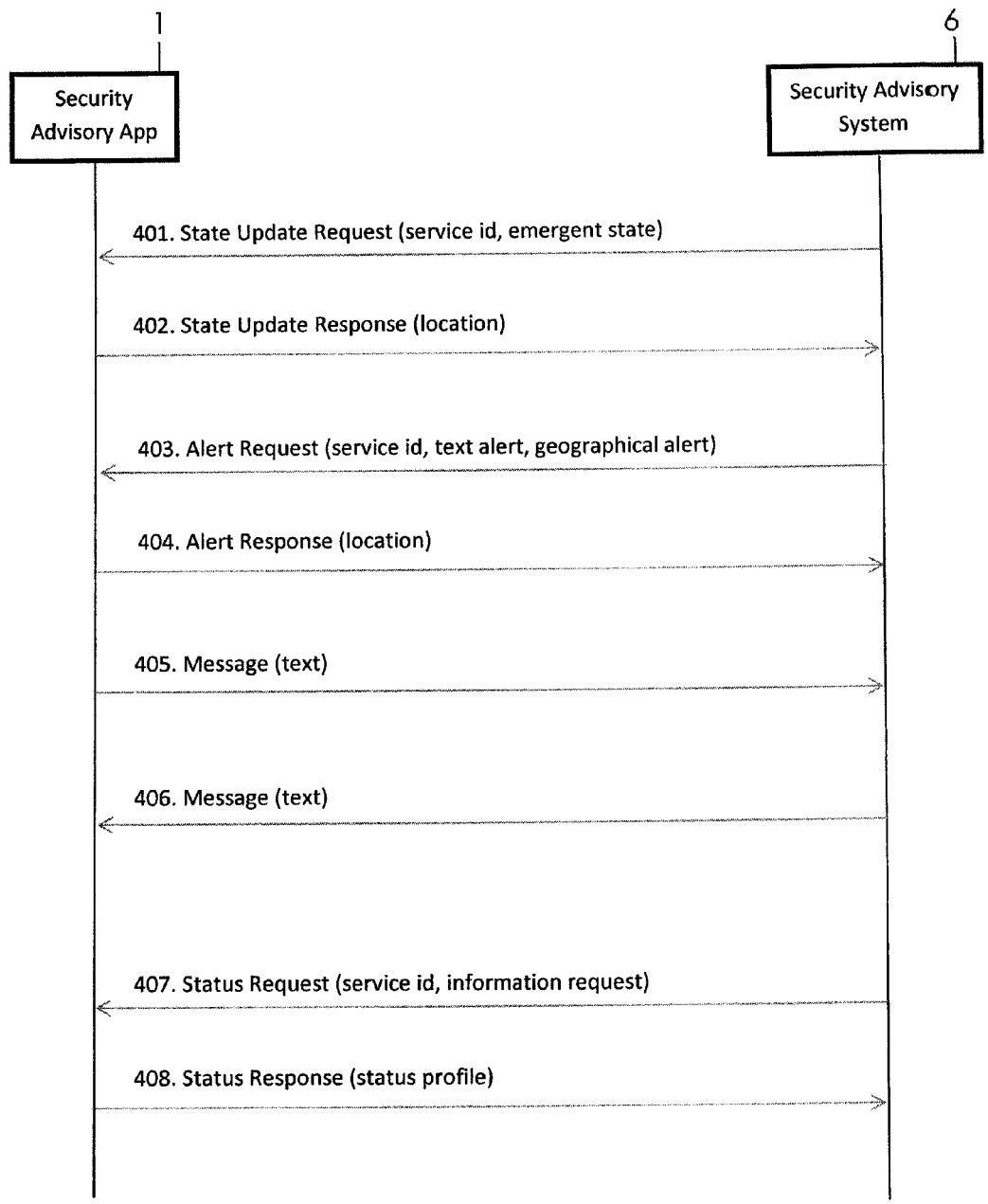
FIG. 5 is an exemplary message flow diagram illustrating the emergency advisory message exchanges in accordance with the present invention.

FIG. 5 is a representation of an exemplary message flow diagram illustrating the emergency advisory message exchanges in accordance with the present invention.

Upon entering an emergency situation, the security advisory system 6 initiates a message 401 to all its registered security advisory apps to enter the emergency state mode. The notified security advisory app 1, after transitioning into emergency state mode, responds to the advisory system 6 and sends back current location data and other information in message 402. Upon a security agent's direction, from time to time, the security advisory system 6 pushes security alerts of different formats to selected registered apps in message 403. The alert can be text alert and/or location zone alerts or even possible escape routes.

The advisory app 1 responds to the advisory system 6 and updates its location in message 404. The app displays the textual alerts and/or the zone alerts visually on the mobile device. From time to time, either the security advisory app 1 or the security advisory system 6 can send text messages 405 and 406 to the other party. From time to time, the security advisory system 6 proactively requests app status information from selected mobile devices in message 407. The status information includes, but is not limited to, the location information, and one or multiple mobile device sensor reading information. Sensor readings may be a barometric or temperature reading or weather related. The security advisory app 1 recognizes itself in the emergency state mode, and collects the requested information, then sends them back to the advisory system 6 in message 408.

It is understood that while certain forms of this invention have been illustrated and described, it is not limited thereto except insofar as such limitations are included in the following claims and allowable functional equivalents thereof.

The invention claimed is:

1. A security system for locating subscribers within a defined area and providing advice to located subscribers during an emergency situation, said security system, comprising:
   a security advisory system including a non-volatile memory having data structures and programming and a processor in communication with said memory and configured to execute respective programming;

a geographical map server configured to store and update geographical map data of predetermined areas, said geographical map server being in electronic communication with said security advisory system and configured to deliver respective geographical map information thereto when requested;

a security advisory application ("app") running on a subscriber's mobile computing device and in data communication with said security advisory system, said security advisory app configured to periodically deliver real time location data to said security advisory system;

wherein said security advisory system is configured via programming to:
receive said location data from said security advisory app;
compare said receive location data with respective geographic data from said geographical map server;
determine if said received location data is in an emergency state and, if so, deliver emergency state response data to said security advisory app;

wherein said security advisory app is configured to receive emergency state response data and to actuate the mobile computing device to display said receive said emergency state response data.

2. The security system as in claim 1, further comprising a blueprint server configured to store and update blueprint data associated with predetermined areas, said blueprint server being in electronic communication with said security advisory system and configured to deliver respective blueprint data information thereto when requested.

3. The security system as in claim 2, wherein said emergency state response data delivered to said security advisory app includes respective geographical map data and respective blueprint data associated with said received location data and said emergency state.

4. The security system as in claim 1, wherein said security advisory app is configured to:
discover if a security advisory system is available to a current geographic location of the mobile device and, if so, to
request registration to said discovered security advisory system and deliver said current geographic location thereto so as to establish tracking and receive emergency state response data;
determine if said security advisory system is no longer available to a current geographic location and, if so, to deregister from said security advisory system.

5. The security system as in claim 4, wherein said security advisory system is configured via programming to:
receive a registration request from said security advisory app;
accept said registration request if a current location of said security advisory app is within boundaries associated with security advisory system;
track said current location of a registered security advisory app; and
determine if an emergency state exists and, if so, deliver said emergency response data to said registered security advisory app, said response data including respective geographical map data associated with said boundaries and said current location.

6. The security system as in claim 5, wherein said security advisory system is in data communication with a plurality of security advisory apps and is configured to register, track, and alert said plurality of security advisory apps in an emergency state.

7. The security system as in claim 5, wherein said security advisory system is configured via programming to deliver respective map data to said security advisory app at a time that is one of 1) immediately upon registration or 2) upon occurrence of an emergency state.

8. The security system as in claim 6, further comprising:
a security advisory catalog server in electronic communication with said security advisory system, wherein the security advisory catalog server includes a database of security advisory services and associated profiles;
wherein said security advisory catalog server includes geographic boundaries associated with the security advisory system, personal identification data associated with the plurality of security advisory apps, subscription data identifying what services are available to respective security advisory apps.

9. The security system as in claim 5 wherein said security advisory system is configured, via programming, to deliver said emergency response data to third party security authorities in an emergency state.

10. The security system as in claim 1, wherein said advisory security system includes said geographical map server and said blueprint server.

11. A method for locating subscribers within a defined area and providing advice to located subscribers during an emergency situation, said method comprising:
a security advisory software application ("security advisory app") running on a mobile computing device receiving boundary data indicative of a predetermined area in which an associated security advisory system is configured to track and alert a security advisory app regarding an emergency state;
said security advisory app detecting by respective boundary data an entry into a respective predetermined area of a respective security advisory system;
said security advisory app sending a registration request, a current geographic location, and real time data to said respective security advisory system;
said security advisory app receiving from said respective security advisory system geographical map data and blueprint data corresponding to the predetermined area associated with said security advisory system and said current geographic location;
said security advisory app receiving from said respective security advisory system emergency response data relating said current geographic location data to said geographical map data, said blueprint data, and advice data regarding an emergency situation; and
said security advisory app causing the mobile computing device to display said emergency response data.

12. The method as in claim 11, wherein said security advisory app electronically retrieves said geographical map data directly from an online geographical map data provider.

13. The method as in claim 11, further comprising:
said security advisory app detecting by respective boundary data an exit from a respective predetermined area of a respective security advisory system; and
said security advisory app deregistering from said security advisory system if said exit is detected.

14. The method as in claim 11, further comprising said security advisory app sending subscription request information to an advisory catalog server that is in communication with said security advisory system, said advisory catalog server determining what security services are available to said security advisory app later making a respective registration request.

15. The method as in claim 11, comprising said security advisory app periodically updating said current geographic location and said real time data to said security advisory system.

16. The method as in claim 11, wherein said security advisory app includes a plurality of security advisory apps running on mobile computing devices independently of one another, each security advisory app selectively registering with said respective security advisory system;

said method further comprising:
 each said security advisory app receiving from said respective security advisory system emergency response data relating said current geographic location data to said geographical map data, said blueprint data, and said advice data regarding an emergency situation.

17. The method as in claim 16, further comprising sending said emergency response data from said security advisory system to security agents.

18. The method as in claim 11, wherein said security advisory system includes a geographical map server having respective geographical map data and a blueprint server having respective blueprint data selectively sent to a said security advisory app.

19. The method as in claim 14, further comprising said security advisory app receiving said emergency response data from said advisory system only if said security advisory app is associated with a subscriber that is authenticated by and associated with respective subscription data in said advisory catalog server in communication with said security advisory system.

20. The method as in claim 11, wherein said emergency response data includes environmental data taken from the group that includes barometric pressure, temperature, and weather conditions.

* * * * *